(12) United States Patent
Lin et al.

(10) Patent No.: US 9,600,050 B2
(45) Date of Patent: Mar. 21, 2017

(54) ELECTRIC POWER MANAGEMENT SYSTEM

(71) Applicant: Sheng-Lian Lin, Taoyuan County (TW)

(72) Inventors: Sheng-Lian Lin, Taoyuan County (TW); Yu-Ying Lin, Taoyuan County (TW)

(73) Assignee: Sheng-Lian Lin, Taoyuan County (TW)

( * ) Notice: Subject to any disclaimer, the term of this patent is extended or adjusted under 35 U.S.C. 154(b) by 445 days.

(21) Appl. No.: 14/467,451

(22) Filed: Aug. 25, 2014

(65) Prior Publication Data
US 2015/0309555 A1      Oct. 29, 2015

(30) Foreign Application Priority Data
Apr. 23, 2014   (TW) .............................. 103114704 A

(51) Int. Cl.
| | | |
|---|---|---|
| H02J 1/00 | (2006.01) | |
| G06F 1/32 | (2006.01) | |
| H02J 7/34 | (2006.01) | |
| G06F 1/26 | (2006.01) | |
| H02J 4/00 | (2006.01) | |
| H02J 3/38 | (2006.01) | |

(52) U.S. Cl.
CPC .............. *G06F 1/3206* (2013.01); *H02J 7/34* (2013.01); *G06F 1/26* (2013.01); *H02J 3/383* (2013.01); *H02J 4/00* (2013.01); *Y10T 307/25* (2015.04)

(58) Field of Classification Search
USPC ..................................................... 307/11, 18
See application file for complete search history.

(56) References Cited

U.S. PATENT DOCUMENTS

2011/0267851 A1* 11/2011 Nagel ................... H02M 3/155
                                                                    363/37
2014/0042993 A1*  2/2014 Nagel ....................... H02P 3/14
                                                                    323/223

FOREIGN PATENT DOCUMENTS

| TW | 200903947 | 1/2009 |
| TW | M401257 | 4/2011 |
| TW | M449409 | 3/2013 |

* cited by examiner

*Primary Examiner* — Danny Nguyen
(74) *Attorney, Agent, or Firm* — WPAT, PC; Justin King

(57) ABSTRACT

An electric power management system includes an electric power generating unit, an electric power storage device and a central control unit. The electric power generating unit generates a first electric power. The electric power storage device, electrically connected to the electric power generating unit, stores the first electric power. The central control unit includes an electric power shunting module and a calculating and processing module. The electric power shunting module, electrically connected to the electric power storage device, controls the electric power storage device to output a second electric power to a client end through an output end of the electric power storage device. The calculating and processing module, electrically connected to the electric power shunting module, records amounts of the first electric power generated by the electric power generating unit and the second electric power consumed by the client end and accordingly outputs analysis information.

6 Claims, 3 Drawing Sheets

ELECTRIC POWER MANAGEMENT SYSTEM

FIELD OF THE INVENTION

The present invention relates to an electric power management system, and more particularly to an electric power management system capable of managing, recording, analyzing and allocating a predetermined electric power to client ends.

BACKGROUND OF THE INVENTION

With the increasing scarcity of natural resources, how to reduce the energy consumption in life has become one of the major issues in the world. In other words, for power saving, the resource consumption reduction is an object must to be done.

Conventionally, the energy supply network is one-way power supply system. Specifically, a physical power plant first delivers high-voltage electric power (for example, 345 KV) to one or more substation; the one or more substation converts the high-voltage electric power into relatively-low-voltage electric power (for example, 22 KV); and then the regional or urban electric power distribution network provides one-way-three-line 110 V/220 V to the client ends. However, in this conventional power supply system based on physical power plant, about 5% of electric power will be lost during the transmitting process from the power plant to the client ends, due to the relatively long transmitting lines and the multi-level power conversion process. Thus, not only the power energy is lost, but also the costs for building the power plants (such as the fire power, nuclear, hydro, steam power or wind power plants) are raised. In addition, because the aforementioned power energy lost, the increasing costs of transmitting lines and related structures, multi-level power conversion process, one or more substation and the power plant itself, users have to pay more for the electric power. In addition, because the natural resources, such as the crude oil, coal and natural gas which can be used for the electric power generation, have increasing prices, a high electricity price is inevitable.

In addition, to avoid the power loss during the power transmitting process and to consider the electric power drop at the end terminal, power plants usually increase the voltage of the electric power during the transmitting process. However, the high-voltage electric power may damage the electrical products at the client ends and accordingly the electrical products may have shorter life and some energy may be wasted.

SUMMARY OF THE INVENTION

One aspect of the present invention is to provide an electric power management system for electric power saving.

The present invention provides an electric power management system, which includes at least an electric power generating unit, at least an electric power storage device and a central control unit. The electric power generating unit is configured to generate a first electric power. The electric power storage device is electrically connected to the electric power generating unit and configured to store the first electric power, the electric power storage device comprising at least an output end. The central control unit includes at least an electric power shunting module and at least a calculating and processing module. The electric power shunting module is electrically connected to the electric power storage device and configured to control the electric power storage device to output at least a second electric power to at least a client end through the output end. The calculating and processing module is electrically connected to the electric power shunting module and configured to record an amount of the first electric power generated by the electric power generating unit, an amount of the second electric power consumed by the client end and accordingly output at least an analysis information.

In one embodiment, the central control unit further includes at least an electric power saving module electrically connected between the output end of the electric power storage device and the client end. The calculating and processing module is further configured to record an amount of the second electric power saved by the electric power saving module. The record of the amount of the second electric power saved by the electric power saving module is integrated with the analysis information.

In one embodiment, the electric power saving module includes a current divider unit and a voltage divider unit. The current divider unit is electrically connected with the client end in parallel. An output end of the current divider unit is electrically connected to an input end of the client end and an input end of the current divider unit is electrically connected to an output end of the client end. The voltage divider unit is electrically connected to the client end in series. An output end of the voltage divider unit is electrically connected to the input end of the client end and an input end of the voltage divider unit is electrically connected to the output end of the electric power storage device.

In one embodiment, the second electric power has a predetermined voltage, and the predetermined voltage is 110 V or 220 V.

In one embodiment, the electric power shunting module is further electrically connected to an external electric power supply network.

In one embodiment, the electric power generating unit includes at least one of a solar power generating apparatus, a wind power generating apparatus and a water power generating apparatus.

In summary, the electric power management system of the present invention can provide the estimation of the electric power usage and the integration of the electric power usage of buildings through the integrated plan and allocation of the electric power.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
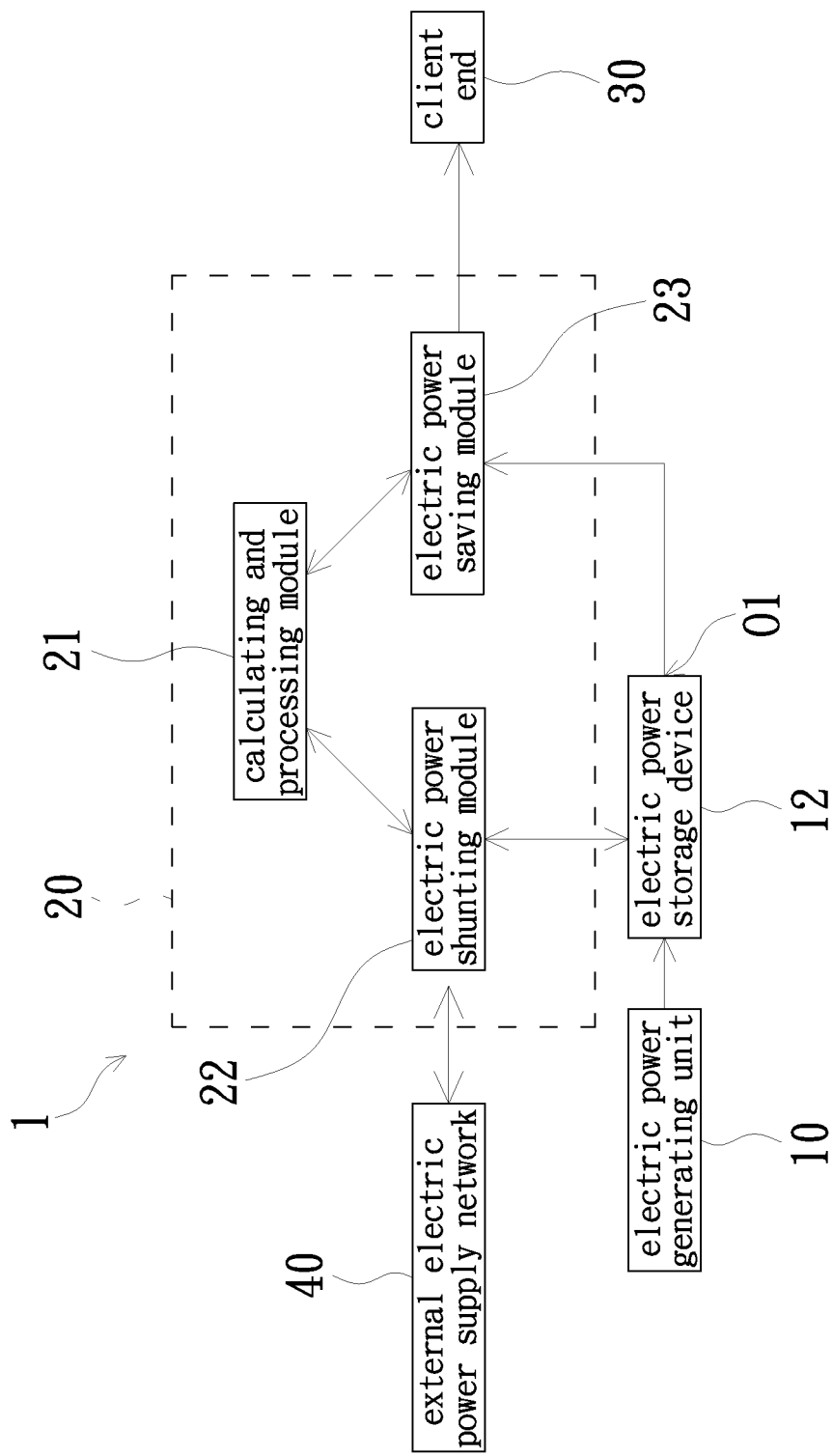
FIG. 1 is a block view of an electric power management system in accordance with an embodiment of the present invention.

Please refer to FIG. 1, which is a block view of an electric power management system in accordance with an embodiment of the present invention. As shown, the electric power management system 1 in the present embodiment includes at least one electric power generating unit 10, at least one electric power storage device 12 and a central control unit 20.

The electric power generating unit 10 is configured to generate a predetermined first electric power during operation and then store the generated first electric power in the electric power storage device 12. The electric power storage device 12 includes at least one output end O1. In one embodiment, the electric power generating unit 10 is selected from a group at least consisting of a solar power generating apparatus, a wind power generating apparatus and a water power generating apparatus; however, the type of the electric power generating unit 10 in the present invention is not limited thereto.

The central control unit 20 includes a calculating and processing module 21 and at least one electric power shunting module 22. The electric power shunting module 22, electrically connected with the calculating and processing module 21 and the electric power storage device 12, is configured to control the electric power storage device 12 to output at least one second electric power to at least one client end 30 through the output end O1 of the electric power storage device 12. The client end 30 may be any type of electrical product relying on electric power for an operation. The second electric power, outputted from the electric power storage device 12 has a predetermined voltage, for example, 110 V or 220 V; however, the present invention is not limited thereto. In one embodiment, the voltage of the first electric power is, for example, higher than the voltage of the second electric power. Furthermore, to avoid that the first electric power generated by the electric power generating unit 10 may not meet the use demand from the client end 30, the electric power shunting module 22 may be further electrically connected to an external electric power supply network 40, such as a power network set up by power company (so-called supply mains). Therefore, the electric power shunting module 22 can selectively supply the external electric power outputted from the external electric power supply network 40 to the client end 30 in response to an actual power demand from the client end 30.

The calculating and processing module 21 is configured to record the amount of the first electric power generated by the electric power generating unit 10, the amount of the second electric power consumed by the client end 30 and accordingly output analysis information. Besides indicating the amount of the generated first electric power and the amount of the consumed second electric power, the analysis information may further indicate, for example, when and how much the client end 30 consumes the electric power. This information can be used for the analysis of electricity consumption situation; thus, the electric power can be managed more efficiently and specific power saving solution can be adopted more correctly. Moreover, in the embodiment that the electric power shunting module 22 is further electrically connected to the external electric power supply network 40, the calculating and processing module 21 is further configured to record the amount of the supplied external electric power and correspondingly the analysis information may further indicate the amount of the external electric power provided by the external electric power supply network 40.

To save the electric power more efficiently, the central control unit 20 may further include an electric power saving module 23, which is electrically connected between the output end O1 of the electric power storage device 12 and the client end 30. Correspondingly, the calculating and processing module 21 may be further configured to record the amount of the second electric power saved by the electric power saving module 23 and accordingly the analysis information may further indicate the amount of the second electric power saved by the electric power saving module 23.

Figure 2:
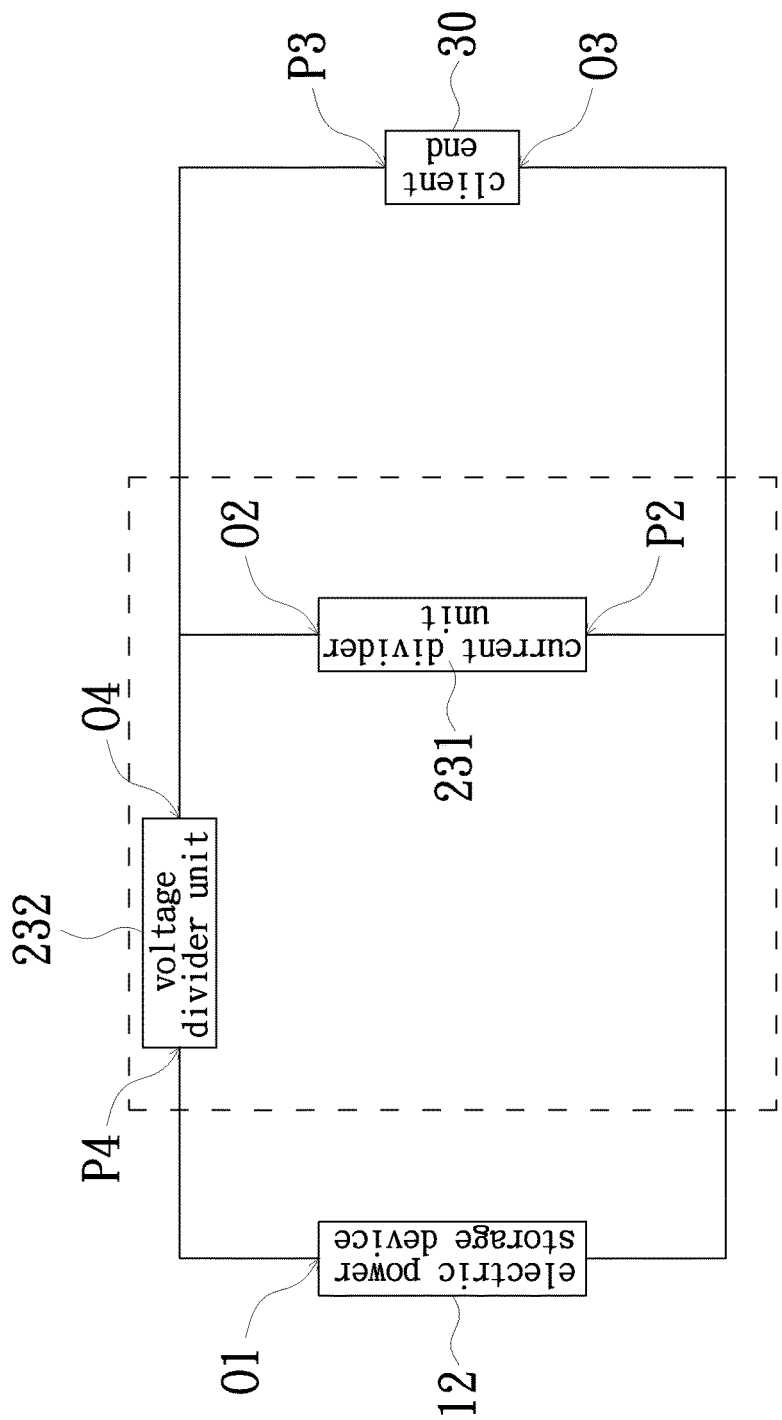
FIG. 2 is a schematic structural view of an electric power saving module in accordance with an embodiment of the present invention.

FIG. 2 is a schematic structural view of the electric power saving module 23 in accordance with an embodiment of the present invention; wherein the structure illustrated in FIG. 2 is used for an exemplary purpose only and the present invention is not limited thereto. As shown, the electric power saving module 23 includes a current divider unit 231 and a voltage divider unit 232. The current divider unit 231 is electrically connected with the client end 30 in parallel. Specifically, an output end O2 of the current divider unit 231 is electrically connected to an input end P3 of the client end 30; and an input end P2 of the current divider unit 231 is electrically connected to an output end O3 of the client end 30.

The voltage divider unit 232 is electrically connected with the client end 30 in series. Specifically, an output end O4 of the voltage divider unit 232 is electrically connected to the input end P3 of the client end 30; and an input end P4 of the voltage divider unit 232 is electrically connected to the output end O1 of the electric power storage device 12.

Figure 3:
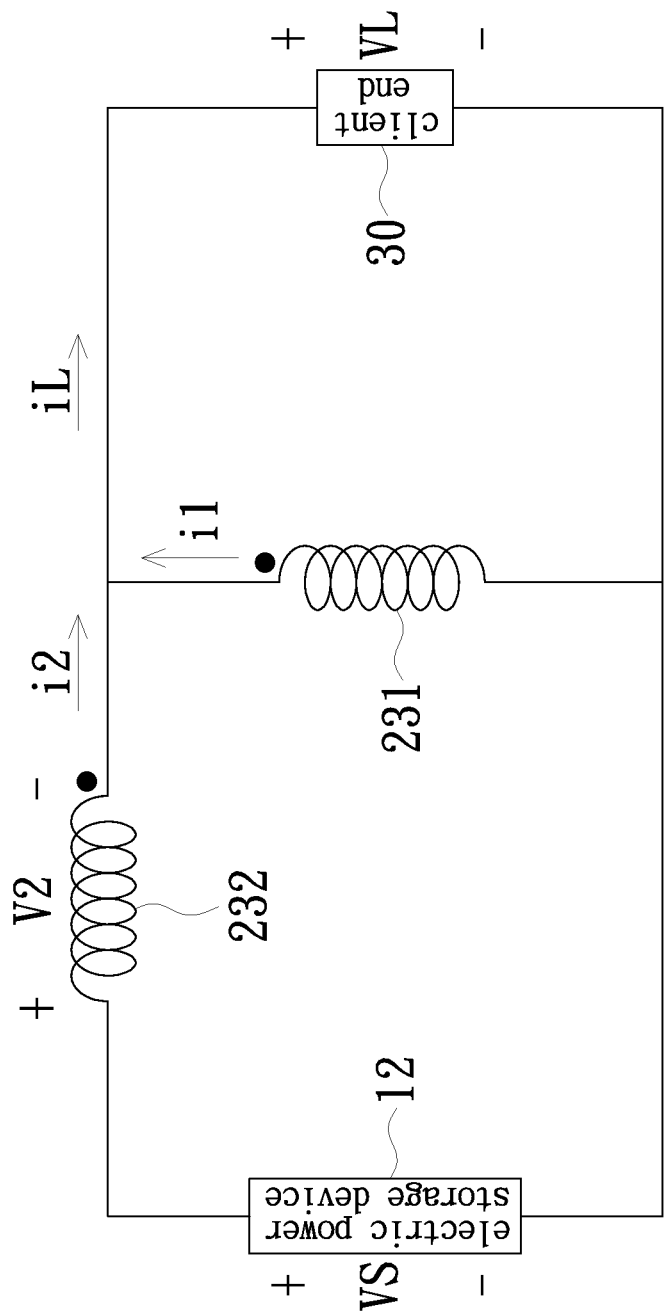
FIG. 3 is a schematic circuit view of an electric power saving module in accordance with an embodiment of the present invention.

FIG. 3 is a schematic circuit view of the electric power saving module 23 in accordance with an embodiment of the present invention. According to the Kirchhoff's voltage law, the voltage VL of the client end 30 is obtained by subtracting the voltage V2 of the voltage divider unit 232 from the total voltage VS of the electric power storage device 12; thus, the object for the voltage reduction is achieved. In addition, according to the Kirchhoff's current law, the current iL flowing into input end P3 of the client end 30 is obtained by adding the current i2 flowing through the voltage divider unit 232 with the current i1 flowing out of the current divider unit 231; thus, the current flowing into the client end 30 can have no any loss. In summary, the electric power saving module 23 of the present invention can reduce the voltage VL of the client end 30 through the voltage divider unit 232 and increases the current iL flowing into the client end 30 through the current divider unit 231; consequentially, the power-saving object is achieved.

The electric power management system 1 of the present invention can be used in some specific buildings, such as houses or stores. Today, because of rapidly-increasing electric-power price and the rapidly-increasing awareness of the environmental protection, not only people are encouraged to save power but also more and more buildings are equipped with clean power generating apparatuses, such as the solar power or wind power, thereby reducing the consumption of supply mains and consequentially achieving the power saving. Moreover, the central control unit 20 of the present invention is configured to distribute electric power, record data and analysis at least the following information: 1. the amount of the electric power generated by the electric power generating unit 10 (that is, the first electric power); 2. The distribution of the second electric power (shunted from the first electric power) to the client end(s) 30 and the record of the corresponding amount the consumed electric power of the client end(s) 30; 3.the amount of the electric power saved by the electric power saving module 23. Thus, through cross checking the aforementioned information, the electric power management system 1 of the present invention can accurately get the amount of the electric power consumed by the client end(s) 30, the saved electric power and the saved cost. In summary, the electric power management system 1 of the present invention can provide the estimation of the electric power usage and the integration of the electric power usage of buildings through the integrated plan and allocation of the electric power.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electric power management system, comprising:
   at least an electric power generating unit, configured to generate a first electric power;
   at least an electric power storage device, electrically connected to the electric power generating unit and configured to store the first electric power, the electric power storage device comprising at least an output end; and
   a central control unit, comprising:
      at least an electric power shunting module, electrically connected to the electric power storage device and configured to control the electric power storage device to output at least a second electric power to at least a client end through the output end; and
      at least a calculating and processing module, electrically connected to the electric power shunting module and configured to record an amount of the first electric power generated by the electric power generating unit, an amount of the second electric power consumed by the client end and accordingly output at least an analysis information.

2. The electric power management system according to claim 1, wherein the central control unit further comprises at least an electric power saving module electrically connected between the output end of the electric power storage device and the client end, wherein the calculating and processing module is further configured to record an amount of the second electric power saved by the at electric power saving module, wherein the record of the amount of the second electric power saved by the at electric power saving module is integrated with the analysis information.

3. The electric power management system according to claim 2, wherein the electric power saving module comprises:
   a current divider unit, electrically connected with the client end in parallel, wherein an output end of the current divider unit is electrically connected to an input end of the client end and an input end of the current divider unit is electrically connected to an output end of the client end; and
   a voltage divider unit, electrically connected to the client end in series, wherein an output end of the voltage divider unit is electrically connected to the input end of the client end and an input end of the voltage divider unit is electrically connected to the output end of the electric power storage device.

4. The electric power management system according to claim 1, wherein the second electric power has a predetermined voltage and the predetermined voltage is 110 V or 220 V.

5. The electric power management system according to claim 1, wherein the electric power shunting module is further electrically connected to an external electric power supply network.

6. The electric power management system according to claim 1, wherein the electric power generating unit comprises at least one of a solar power generating apparatus, a wind power generating apparatus and a water power generating apparatus.

* * * * *